(12) United States Patent
Ito

(10) Patent No.: US 11,563,236 B2
(45) Date of Patent: Jan. 24, 2023

(54) ALL-SOLID BATTERY AND MANUFACTURING METHOD OF THE SAME

(71) Applicant: TAIYO YUDEN CO., LTD., Tokyo (JP)

(72) Inventor: Daigo Ito, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 209 days.

(21) Appl. No.: 17/082,452

(22) Filed: Oct. 28, 2020

(65) Prior Publication Data

US 2021/0159538 A1   May 27, 2021

(30) Foreign Application Priority Data

Nov. 21, 2019   (JP) .............................. JP2019-210397

(51) Int. Cl.
  *H01M 6/04*    (2006.01)
  *H01M 10/0562*    (2010.01)
  *H01M 10/058*    (2010.01)

(52) U.S. Cl.
  CPC ..... *H01M 10/0562* (2013.01); *H01M 10/058* (2013.01)

(58) Field of Classification Search
  CPC ......... H01M 10/0562; H01M 10/0561; H01M 10/056; H01M 10/058; H01M 10/0585
  See application file for complete search history.

(56) References Cited

U.S. PATENT DOCUMENTS

| | | | | |
|---|---|---|---|---|
| 2017/0317334 | A1* | 11/2017 | Yura | ................... H01M 10/052 |
| 2018/0198169 | A1* | 7/2018 | Fukui | ...................... H01M 4/64 |
| 2018/0375151 | A1* | 12/2018 | Gaben | ................... H01M 4/139 |
| 2019/0341621 | A1 | 11/2019 | Masuko et al. | ....... H01M 4/628 |

FOREIGN PATENT DOCUMENTS

| | | |
|---|---|---|
| JP | S 60-201608 A | 10/1985 |
| JP | H 06-231996 A | 8/1994 |
| JP | 2007-080812 A | 3/2007 |
| JP | 2007-095818 A | 4/2007 |
| WO | WO 2018/181379 A1 | 10/2018 |

* cited by examiner

*Primary Examiner* — Raymond Alejandro
(74) *Attorney, Agent, or Firm* — Stein IP, LLC

(57) ABSTRACT

An all-solid battery includes a multilayer structure that includes pairs of positive electrode layers and pairs of negative electrode layers, first solid electrolyte layers, second solid electrolyte layers, and third solid electrolyte layers, the pairs of positive electrode layers and the pairs of negative electrode layers being alternately stacked, each of the first solid electrolyte layers being interposed between each of the pairs of positive electrode layers, each of the second solid electrolyte layers being interposed between each of the pairs of negative electrode layers, each of the third solid electrolyte layers being interposed between the positive electrode layer and the negative electrode layer, wherein a thickness of the third solid electrolyte layer is different from at least one of a thickness of the first electrolyte layer and a thickness of the second electrolyte layer.

8 Claims, 17 Drawing Sheets

ALL-SOLID BATTERY AND MANUFACTURING METHOD OF THE SAME

CROSS-REFERENCE TO RELATED APPLICATION

This application is based upon and claims the benefit of priority of the prior Japanese Patent Application No. 2019-210397, filed on Nov. 21, 2019, the entire contents of which are incorporated herein by reference.

FIELD

A certain aspect of the present embodiments relates to an all-solid battery and a manufacturing method of the same.

BACKGROUND

Secondary batteries have been used in various fields. Secondary batteries having an electrolytic solution have a problem such as leak of the electrolytic solution. Thus, all-solid batteries having a solid electrolyte and other solid elements are suggested as disclosed in Japanese Patent Application Publication No. 2007-80812 and International Publication No. WO2018/181379.

The all-solid battery is manufactured by alternately stacking electrode layers and solid electrolyte layers, and then sintering the multilayer structure constructed of the electrode layers and the solid electrolyte layers. A multilayer ceramic capacitor is another device fabricated by sintering the multilayered body. The multilayer ceramic capacitor is fabricated by stacking green sheets each having an electrode layer formed on a part of the surface thereof.

In this structure, the electrode layer exists in the part, but no electrode layer exists in the remaining part. Thus, in the cross-sectional view, the multilayer ceramic capacitor has the part where the electrode layer exists and the part where no electrode layer exists. Such presence and absence of the electrode layer may cause cracks to be generated in the multilayer ceramic capacitor.

To inhibit generation of cracks, suggested is a structure in which an adjustment layer for reducing the level difference due to presence and absence of the electrode layer is formed between the adjacent electrode layers in the vertical direction as disclosed in Japanese Patent Application Publication No. H6-231996. The adjustment layer is a green sheet having no electrode layer formed thereon, and insertion of this green sheet between the adjacent electrode layers in the vertical direction reduces the level difference due to presence and absence of the electrode layer, and inhibits cracks from being generated in the device.

However, when the adjustment layer is interposed between each two adjacent electrode layers in the all-solid battery, the thickness of the all-solid battery increases, and therefore it is difficult to reduce the size of the all-solid battery.

SUMMARY

According to a first aspect of the present embodiments, there is provided an all-solid battery including: a multilayer structure that includes a plurality of pairs of positive electrode layers and a plurality of pairs of negative electrode layers, first solid electrolyte layers, second solid electrolyte layers, and third solid electrolyte layers, the plurality of pairs of positive electrode layers and the plurality of pairs of negative electrode layers being alternately stacked, each of the first solid electrolyte layers being interposed between each of the pairs of positive electrode layers, each of the second solid electrolyte layers being interposed between each of the pairs of negative electrode layers, each of the third solid electrolyte layers being interposed between the positive electrode layer and the negative electrode layer, wherein a thickness of the third solid electrolyte layer between the positive electrode layer and the negative electrode layer is different from at least one of a thickness of the first electrolyte layer between a pair of positive electrode layers and a thickness of the second electrolyte layer between a pair of negative electrode layers.

According to a second aspect of the present embodiments, there is provided a manufacturing method of an all-solid battery including: making a multilayer structure by stacking a pair of first green sheets each having a positive electrode paste applied on a surface thereof, a pair of second green sheets each having a negative electrode paste applied on a surface thereof, and a third green sheet having no conductive paste applied on both surfaces thereof; and firing the multilayer structure to make the first to third green sheets into solid electrolyte layers, the positive electrode paste into a positive electrode layer, and the negative electrode paste into a negative electrode layer, wherein the making of the multilayer structure includes alternately stacking the pair of first green sheets and the pair of second green sheets in plural, and arranging the third green sheet so that the third green sheet is interposed at least between the pair of first green sheets, between the pair of second green sheets, or between the first green sheet and the second green sheet.

DETAILED DESCRIPTION

A description will be given of embodiments with reference to the accompanying drawings.

First Embodiment

Figure 1:
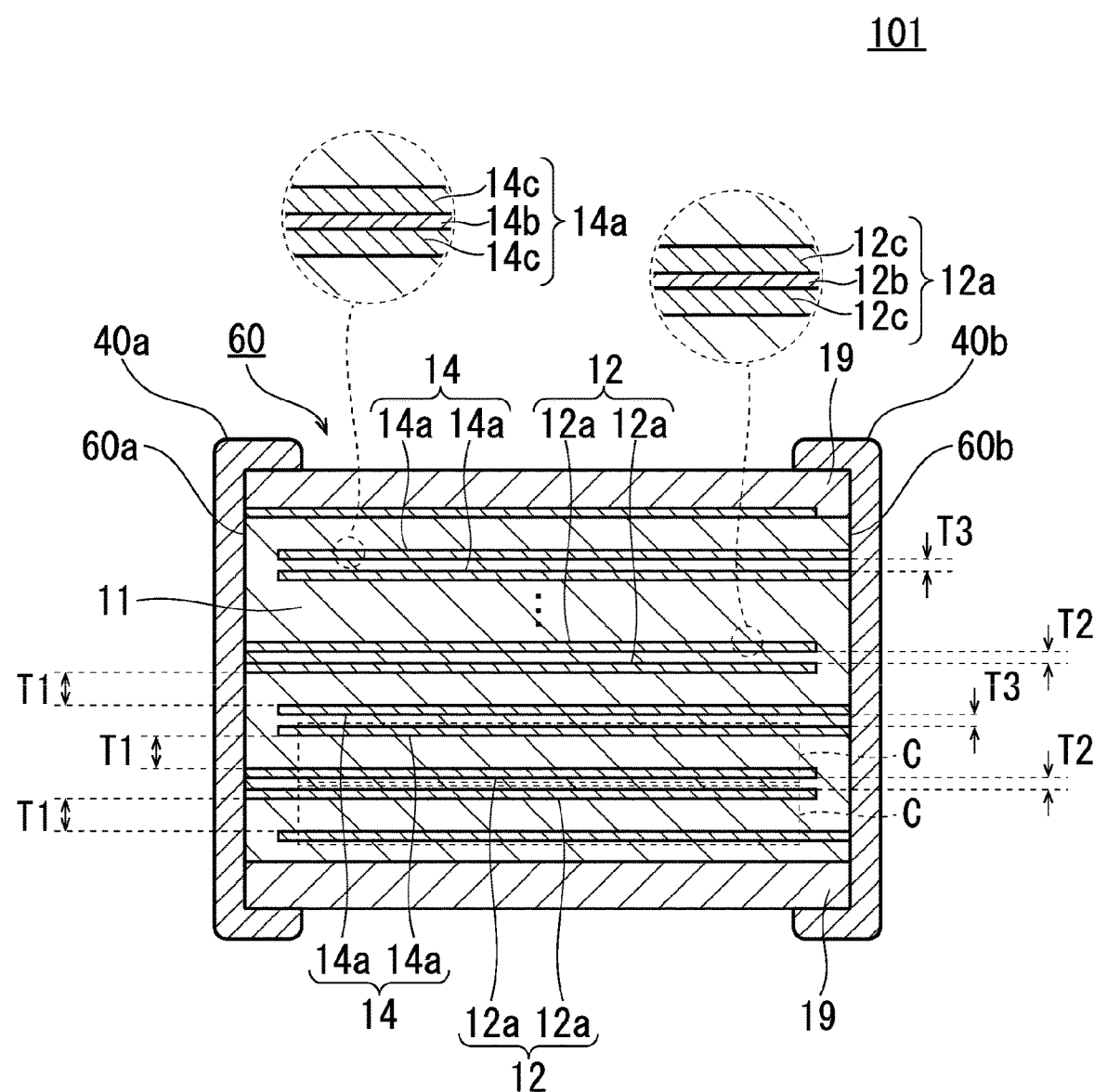
FIG. 1 is a schematic cross-sectional view illustrating a fundamental structure of an all-solid battery in accordance with a first embodiment.

FIG. 1 is a schematic cross-sectional view illustrating a fundamental structure of an all-solid battery 101 in accordance with a first embodiment. As illustrated in FIG. 1, the all-solid battery 100 includes a multilayer structure 60, and a first external electrode 40a and a second external electrode 40b respectively disposed on side faces 60a and 60b of the multilayer structure 60. The multilayer structure 60 has a structure in which positive electrodes 12 each being constructed of a pair of positive electrode layers 12a opposite to each other and negative electrodes 14 each being constructed of a pair of negative electrode layers 14a opposite to each other are alternately stacked. The positive electrodes 12 are connected to the first external electrode 40a on the side face 60a. The negative electrodes 14 are connected to the second external electrode 40b on the side face 60b.

A solid electrolyte layer 11 is interposed between each pair of the positive electrode layers 12a opposite to each other, and another solid electrolyte layer 11 is interposed between each pair of the negative electrode layers 14a opposite to each other. Yet another solid electrolyte layer 11 is also interposed between the positive electrode 12 and the negative electrode 14. The solid electrolyte layer 11 between each pair of the positive electrode layers 12a is an example of a first solid electrolyte layer, and the solid electrolyte layer 11 between each pair of the negative electrode layers 14a is an example of a second solid electrolyte layer. The solid electrolyte layer 11 between the positive electrode layer 12a and the negative electrode layer 14a adjacent to each other in the vertical direction is an example of a third solid electrolyte layer. Among outer faces of the multilayer structure 60, the outer faces parallel to the direction in which the positive electrodes 12 and the negative electrodes 14 are stacked (a stack direction) are the side faces 60a and 60b, and the outer faces perpendicular to these side faces 60a and 60b are the bottom face and the top face. A cover layer 19 is provided on the top face, and another cover layer 19 is provided on the bottom face.

The positive electrode layer 12a includes a first current collector layer 12b and conductive first electrode layers 12c disposed on both principal faces of the first current collector layer 12b. The negative electrode layer 14a includes a second current collector layer 14b and conductive second electrode layers 14c disposed on both principal faces of the second current collector layer 14b. The first current collector layer 12b may be omitted and the positive electrode layer 12a may be constructed of only the first electrode layer 12c. Similarly, the second current collector layer 14b may be omitted and the negative electrode layer 14a may be constructed of only the second electrode layer 14c.

The thickness of the positive electrode layer 12a and the thickness of the negative electrode layer 14a are not particularly limited. For example, the first electrode layer 12c has a thickness of approximately 1 μm to 100 μm, and the first current collector layer 12b has a thickness of approximately 0.5 μm to 5 μm. The second electrode layer 14c has a thickness of approximately 1 μm to 100 μm, and the second current collector layer 14b has a thickness of approximately 0.5 μm to 5 μm.

At least, the first electrode layer 12c used as a positive electrode contains, as an electrode active material, a material having an olivine type crystal structure. It is preferable that the second electrode layer 14c also contains the electrode active material. Examples of the electrode active material include, but are not limited to, a phosphate that contains a transition metal and lithium. The olivine type crystal structure is a crystal of natural olivine. It is possible to identify the olivine type crystal structure, by using X-ray diffraction.

$LiCoPO_4$ containing Co may be used as a typical example of the electrode active material having the olivine type crystal structure. Other phosphates, in which Co acting as a transition metal is replaced with another transition metal in the above-mentioned chemical formula, may be used. The percentage of Li and the percentage of $PO_4$ may fluctuate in accordance with a valence. Use of Co, Mn, Fe, Ni, or the like as the transition metal is preferable.

The electrode active material having the olivine type crystal structure acts as a positive-electrode active material in the first electrode layer 12c acting as a positive electrode. For example, when only the first electrode layer 12c contains the electrode active material having the olivine type crystal structure, the electrode active material acts as the positive electrode active material. When the second electrode layer 14c also contains an electrode active material having the olivine type crystal structure, a discharge capacity may increase and an operation voltage may increase because of electric discharge, in the second electrode layer 14c acting as a negative electrode. The function mechanism is not completely clear. However, the mechanism may be caused by partial solid-phase formation together with the negative electrode active material.

The second electrode layer 14c may further contain a negative-electrode active material. Examples of the negative-electrode active material include titanium oxide, lithium titanium complex oxide, lithium titanium complex phosphate, carbon, and vanadium lithium phosphate.

In the forming process of the first electrode layer 12c and the second electrode layer 14c, moreover, an oxide-based solid electrolyte material or a conductive material (a conductive auxiliary agent) is added. In the present embodiment, paste for electrode layer is obtained by uniformly dispersing the material into water or organic solvent together with a binder and a plasticizer. In the present embodiment, a carbon material is included as a conductive auxiliary agent. A metal may be further included as the conductive auxiliary agent. Examples of the metal of the conductive auxiliary agent include, but are not limited to, Pd, Ni, Cu, or Fe, or an alloy thereof.

At least, the solid electrolyte layer 11 is an oxide-based solid electrolyte. For example, the solid electrolyte layer 11 may be a phosphate-based solid electrolyte having a NASICON structure. The phosphate-based solid electrolyte having a NASICON structure has a high conductivity and is stable in normal atmosphere. The phosphate-based solid electrolyte is, for example, a phosphate that contains lithium. Examples of the phosphate that contains lithium include, but are not limited to, a composite salt of phosphoric acid with Ti (for example, $LiTi_2(PO_4)_3$). Alternatively, at least a part of Ti may be replaced with a quadrivalent transition metal such as, but not limited to, Ge, Sn, Hf, or Zr. To increase the content of Li, a part of Ti may be replaced with a trivalent transition metal such as, but not limited to, Al, Ga, In, Y or La. More specifically, examples of the phosphate that contains lithium include, but are not limited to, $Li_{1+x}Al_xGe_{2-x}(PO_4)_3$, $Li_{1+x}AlxZr_{2-x}(PO_4)3$, or $Li_{1+x}Al_xTi_{2-x}(PO_4)_3$. For example, it is preferable that a Li-Al-Ge-PO$_4$-based material, to which a transition metal contained in the phosphate having the olivine type crystal structure contained in at least one of the first electrode layer 12c and the second electrode layer 14c is added in advance, is used. For example, when the first electrode layer 12c and the second electrode layer 14c contain a phosphate that contains at least one of Co and Li, the solid electrolyte layer 11 preferably contains a Li-Al-Ge-PO$_4$-based material to which Co is added in advance. In this case, it is possible to inhibit the transition metal contained in the electrode active material from solving into the electrolyte. When the first electrode layer 12c and the second electrode layer 14c contain a phosphate that contains Li and a transition element other than Co, the solid electrolyte layer 11 preferably contains a Li-Al-Ge-PO$_4$-based material to which the transition element is added in advance. The material of the cover layer 19 is not particularly limited. The material identical to the material of the solid electrolyte layer 11 may be used as the material of the cover layer 19.

In the present embodiment, by following the manufacturing process described below, the thickness T1 of the solid electrolyte layer 11 between the positive electrode layer 12a and the negative electrode layer 14a adjacent to each other in the vertical direction is adjusted to be greater than the thickness T2 of the solid electrolyte layer 11 between a pair of the positive electrode layers 12a, and is adjusted to be greater than the thickness T3 of the solid electrolyte layer 11 between a pair of the negative electrode layers 14a. Such a magnitude relation of the thicknesses T1, T2, and T3 allows the all-solid battery 101 to be thin, and inhibits generation of cracks.

The following will describe the manufacturing method of the all-solid battery 101 capable of reducing the thickness of the all-solid battery 101 and inhibiting generation of cracks.

Figure 2:
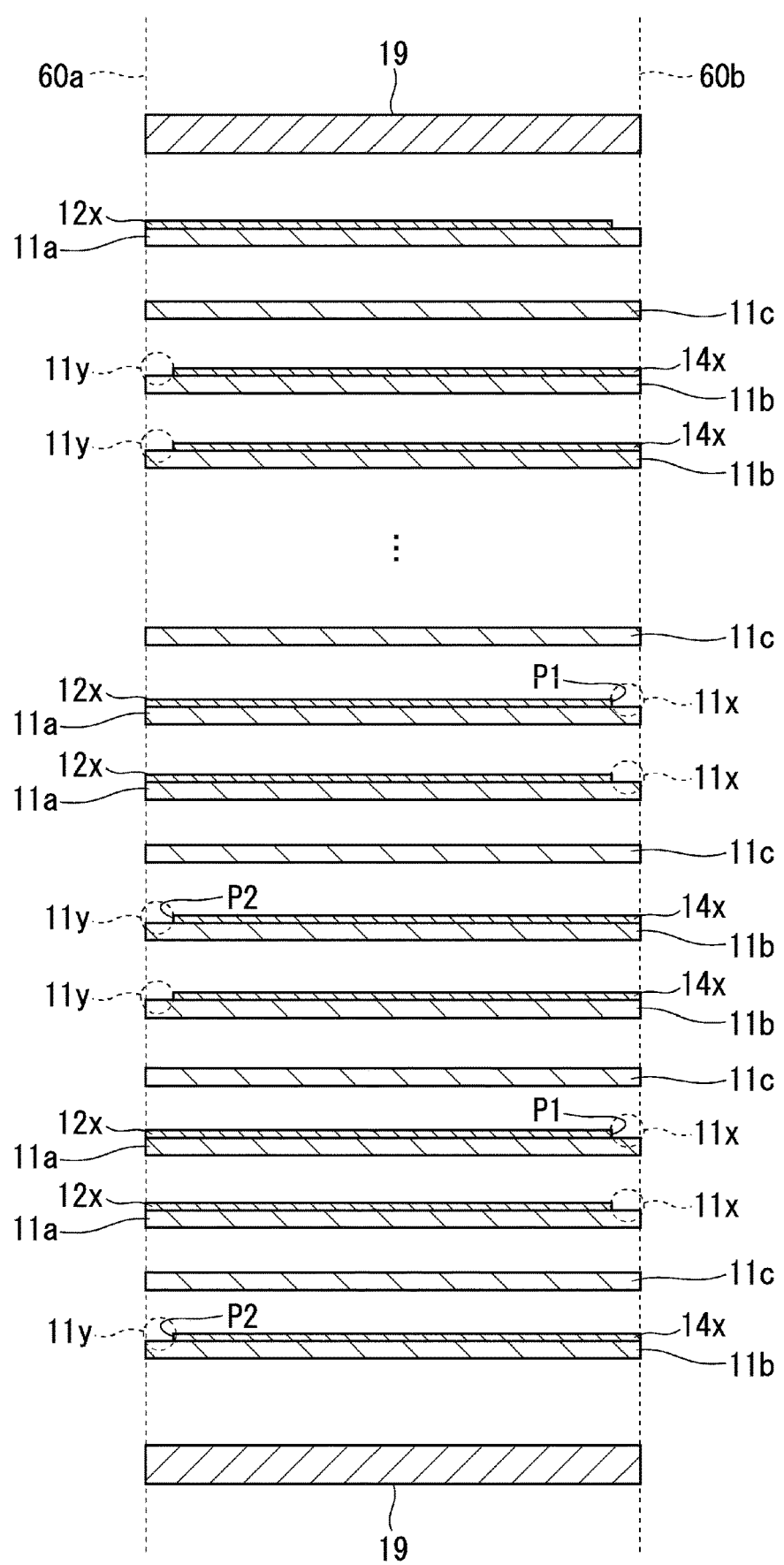
FIG. 2 is a cross-sectional view of the all-solid battery in the course of manufacturing in accordance with the first embodiment.

FIG. 2 is a cross-sectional view of the all-solid battery in the course of manufacturing in accordance with the present embodiment. As illustrated in FIG. 2, a plurality of first green sheets 11a, a plurality of second green sheets 11b, and a plurality of third green sheets 11c are prepared. A positive electrode paste 12x is applied to a surface of the first green sheet 11a in advance. The edge of the positive electrode paste 12x is located away from the second side face 60b, and therefore a first margin part 11x where no positive electrode paste 12x exists is formed on the first green sheet 11a.

A negative electrode paste 14x is applied to a surface of the second green sheet 11b in advance. The edge of the negative electrode paste 14x is located away from the first side face 60a, and therefore a second margin part 11y where no negative electrode paste 14x exists is formed on the second green sheet 11b. The third green sheet 11c is a green sheet having no conductive paste, including the positive electrode paste 12x and the negative electrode paste 14x, applied to both surfaces thereof.

In the present embodiment, two first green sheets 11a are adjacent to each other in the vertical direction, and two second green sheets 11b are adjacent to each other in the vertical direction. The third green sheet 11c is interposed only between the first green sheet 11a and the second green sheet 11b. This structure allows the thickness of the all-solid battery to be less than the thickness of the all-solid battery in which the third green sheet 11c is interposed between each two adjacent layers of all the layers.

The number of the first green sheets 11a and the number of the second green sheets 11b are not particularly limited. Here, the number of the first green sheets 11a is 25, and the number of the second green sheets 11b is 25.

The cover layers 19 are disposed on the outermost layers of these green sheets 11a to 11c, and the green sheets 11a to 11c are stacked together with the cover layers 19. The green sheets 11a to 11c are stacked in a manner such that the first margin parts 11x of two first green sheets 11a adjacent to each other in the vertical direction overlap in the stack direction, and the second margin parts 11y of two second green sheets 11b adjacent to each other in the vertical direction overlap in the stack direction.

Then, the green sheets 11a to 11c, the positive electrode pastes 12x, the negative electrode pastes 14x, and the cover layers 19 are fired to make the multilayer structure 60, and a metal paste is then applied to each of the side faces 60a and 60b and fired to form the external electrodes 40a and 40b. Through this process, the fundamental structure of the all-solid battery 101 in FIG. 1 is completed.

In the embodiment described above, the third green sheet 11c on which neither the positive electrode paste 12x nor the negative electrode paste 14x is applied is interposed between the layers of the multilayer structure 60. Thus, the level difference P1 between the first green sheet 11a and the positive electrode paste 12x and the level difference P2 between the second green sheet 11b and the negative electrode paste 14x are filled with the third green sheet 11c, and cracks due to the level differences P1 and P2 are inhibited from being generated in the edge of the multilayer structure 60.

Additionally, in the present embodiment, the third green sheet 11c acting as the adjustment layer is interposed only between the first green sheet 11a and the second green sheet 11b. This allows the thickness of the all-solid battery 101 to be less than that of the all-solid battery in which the third green sheet 11c is interposed between each two adjacent layers of all the layers.

Furthermore, there are a plurality of battery structures C constructed of the positive electrode layer 12a and the negative electrode layer 14a, which are adjacent to each other in the vertical direction, and the solid electrolyte layer 11, which is interposed between the positive electrode layer 12a and the negative electrode layer 14a, inside the multilayer structure 60, but the thickness T1 of the solid electrolyte layer 11 is the same among these battery structures C. Thus, the electromotive forces of the battery structures C are equal to each other, and therefore the all-solid battery 101 having a well-balanced electromotive force is obtained. The same applies to second to fifth embodiments.

EXAMPLE 1

The all-solid battery 101 was fabricated according to the first embodiment. The thickness T1 of the solid electrolyte layer 11 between the positive electrode layer 12a and the negative electrode layer 14a was approximately 20 μm. The thickness T2 of the solid electrolyte layer 11 between a pair of the positive electrode layers 12a was approximately 10 μm, and the thickness T3 of the solid electrolyte layer 11 between a pair of the negative electrode layers 14a was approximately 10 μm. Furthermore, the thickness of the all-solid battery 101 was less, by approximately 250 μm, than the all-solid batter in which the third green sheet 11c is disposed between each two adjacent layers. In addition, no cracks were observed.

Second Embodiment

Figure 3:
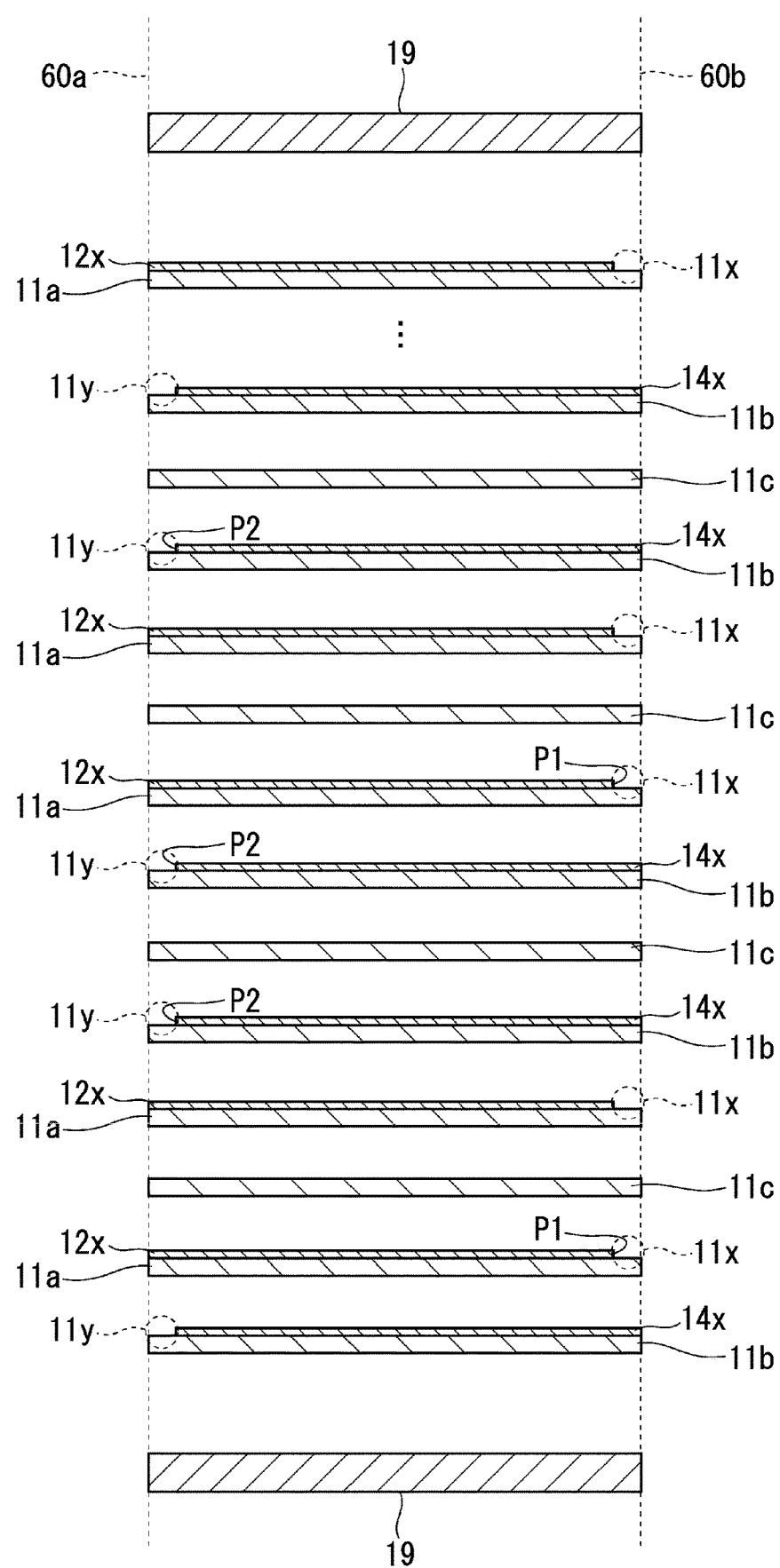
FIG. 3 is a cross-sectional view of an all-solid battery in the course of manufacturing in accordance with a second embodiment.

FIG. 3 is a cross-sectional view of an all-solid battery in the course of manufacturing in accordance with the second embodiment. In FIG. 3, the same elements as those described in the first embodiment are indicated by the same reference numerals as those in the first embodiment, and the description thereof is omitted hereafter.

As illustrated in FIG. 3, in the present embodiment, the first green sheet 11a and the second green sheet 11b are adjacent to each other in the vertical direction in the multilayer structure 60. The third green sheet 11c is interposed between two first green sheets 11a adjacent to each other in the vertical direction, and another third green sheet 11c is interposed between two second green sheets 11b adjacent to each other in the vertical direction. By manufacturing the all-solid battery as described above, the thickness of the all-solid battery is reduced, and generation of cracks is inhibited.

The number of the first green sheets 11a and the number of the second green sheets 11b are not particularly limited. In the second embodiment, the number of the first green sheets 11a is 25 and the number of the second green sheets 11b is 25 as in the first embodiment.

Figure 4:
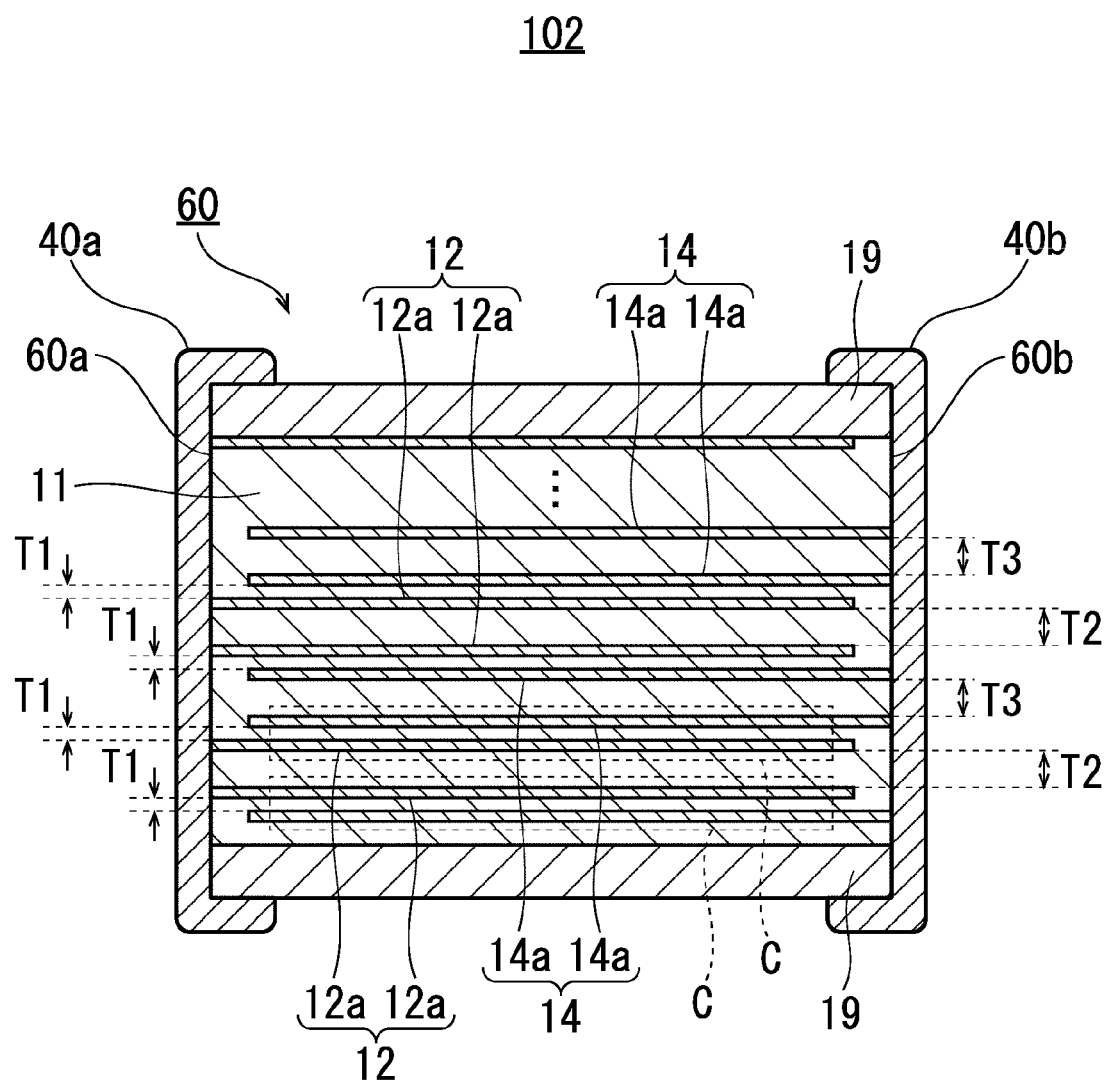
FIG. 4 is a schematic cross-sectional view of the all-solid battery in accordance with the second embodiment.

FIG. 4 is a schematic cross-sectional view of the all-solid battery of the second embodiment obtained by firing the multilayer structure 60. As illustrated in FIG. 4, in an all-solid battery 102 in accordance with the second embodiment, the thickness T2 of the solid electrolyte layer 11 between a pair of the positive electrode layers 12a and the thickness T3 of the solid electrolyte layer 11 between a pair of the negative electrode layers 14a are both greater than the thickness T1 of the solid electrolyte layer 11 between the positive electrode layer 12a and the negative electrode layer 14a.

In this structure, no third green sheet 11c exists inside the battery structure C and the thickness T1 is less than the thicknesses T2 and T3. Thus, the thickness of the solid electrolyte layer 11 in the battery structure C can be reduced. In addition, since the third green sheet 11c is not provided between all the layers of the multilayer structure 60, the thickness of the all-solid battery 102 is less than the all-solid battery in which the third green sheet 11c is interposed between each two adjacent layers of all the layers.

EXAMPLE 2

The all-solid battery 102 was fabricated according to the second embodiment. The thickness T1 was approximately 10 µm, and the thickness T2 and the thickness T3 were both approximately 20 µm. In addition, no cracks were observed. Furthermore, the thickness of the all-solid battery 102 was less, by approximately 250 µm, than the all-solid battery in which the third green sheet 11c is interposed between each two adjacent layers of all the layers.

Third Embodiment

Figure 5:
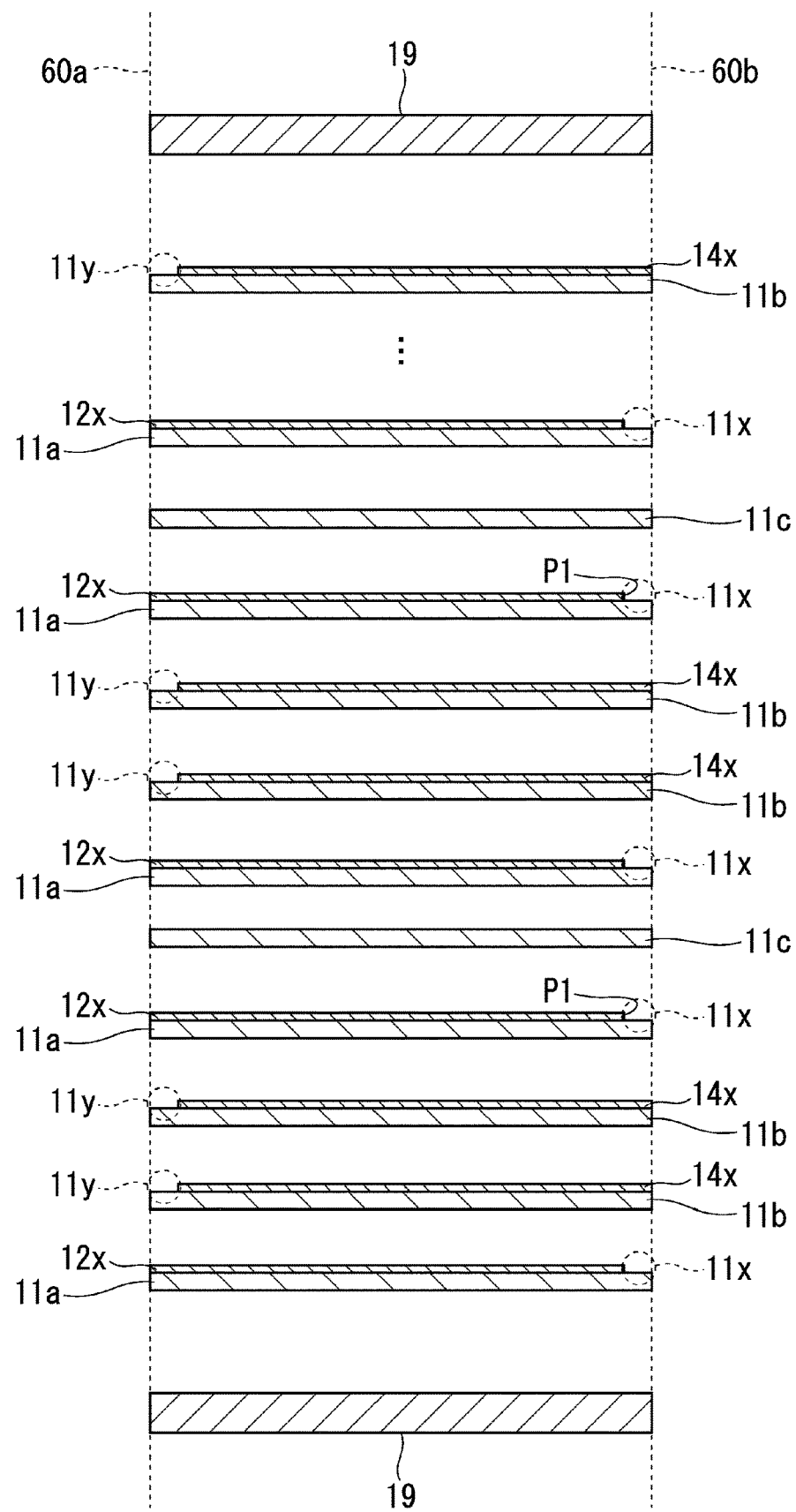
FIG. 5 is a cross-sectional view of an all-solid battery in the course of manufacturing in accordance with a third embodiment.

FIG. 5 is a cross-sectional view of an all-solid battery in the course of manufacturing in accordance with the third embodiment. In FIG. 5, the same elements as those described in the first and second embodiments are indicated by the same reference numerals as those in the first and second embodiments, and the description thereof is omitted hereafter.

As illustrated in FIG. 5, in the third embodiment, the first green sheet 11a and the second green sheet 11b are adjacent to each other in the vertical direction in the multilayer structure 60 as in the second embodiment. However, the third green sheet 11c is interposed only between two first green sheets 11a adjacent to each other in the vertical direction, and no third green sheet 11c is interposed between two second green sheets 11b adjacent to each other in the vertical direction. By manufacturing the all-solid battery as described above, the thickness of the all-solid battery is reduced and generation of cracks is inhibited.

The number of the first green sheets 11a and the number of the second green sheets 11b are not particularly limited. In the third embodiment, the number of the first green sheets 11a is 25, and the number of the second green sheets 11b is 25 as in the first embodiment.

Figure 6:
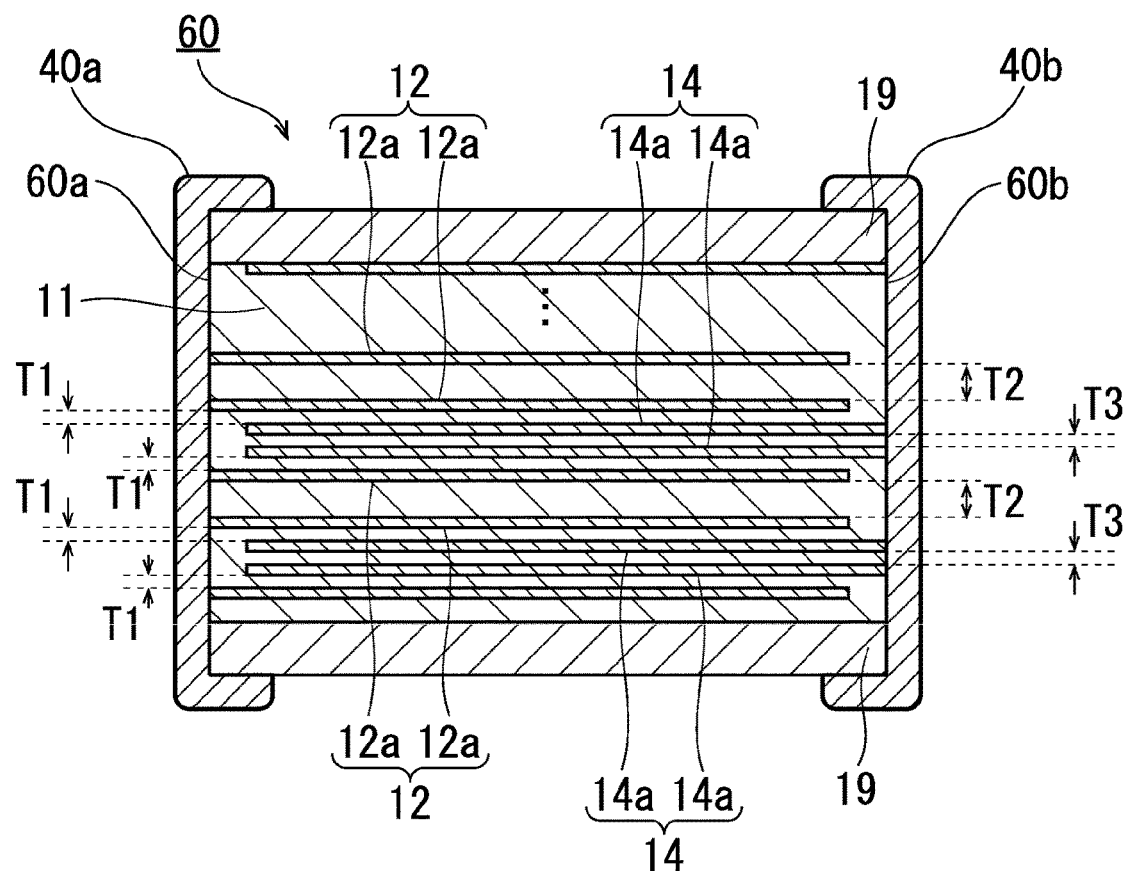
FIG. 6 is a schematic cross-sectional view of the all-solid battery in accordance with the third embodiment.

FIG. 6 is a schematic cross-sectional view of the all-solid battery in accordance with the third embodiment obtained by firing the multilayer structure 60. As illustrated in FIG. 6, in an all-solid battery 103 in accordance with the third embodiment, the thickness T2 of the solid electrolyte layer 11 between a pair of the positive electrode layers 12a is greater than the thickness T3 of the solid electrolyte layer 11 between a pair of the negative electrode layers 14a and the thickness T1 of the solid electrolyte layer 11 between the positive electrode layer 12a and the negative electrode layer 14a.

In this structure, the thicknesses T1 and T3 are less than the thickness T2, and the number of the third green sheets 11c is less than that in the second embodiment. Thus, the all-solid battery 103 is thinner than the all-solid battery 102 of the second embodiment.

EXAMPLE 3

The all-solid battery 103 was fabricated according to the third embodiment. The thickness T2 was approximately 20 µm, and the thickness T1 and the thickness T3 were both approximately 10 µm. In addition, no cracks were observed. In addition, the thickness of the all-solid battery 103 was less, by approximately 370 µm, than the all-solid battery in which the third green sheet 11c is interposed between each two adjacent layers of all the layers.

Fourth Embodiment

Figure 7:
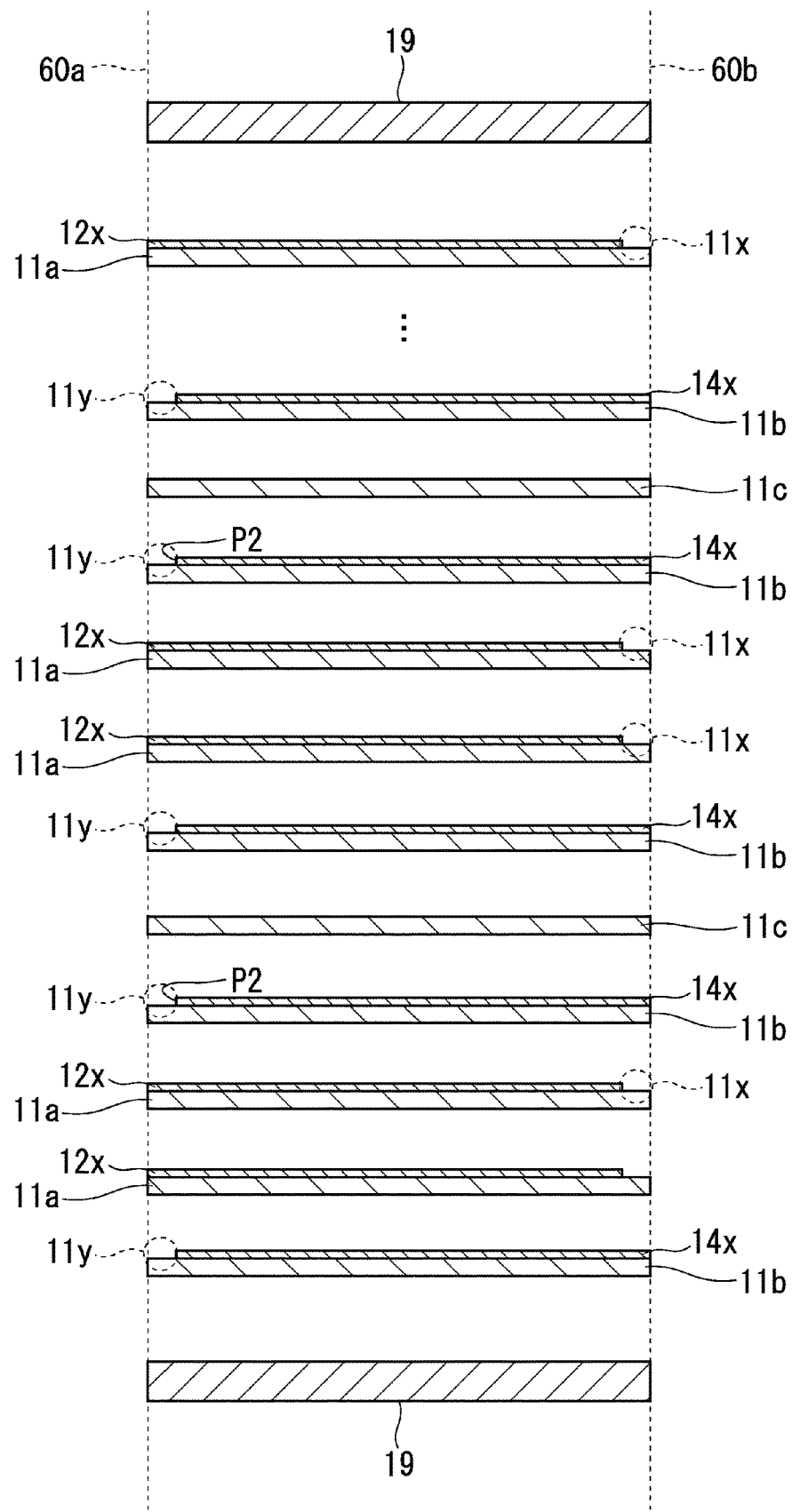
FIG. 7 is a cross-sectional view of an all-solid battery in the course of manufacturing in accordance with a fourth embodiment.

FIG. 7 is a cross-sectional view of an all-solid battery in the course of manufacturing in accordance with the fourth embodiment. In FIG. 7, the same elements as those described in the first to third embodiments are indicted by the same reference numerals as those in these embodiments, and the description thereof is omitted hereafter.

As illustrated in FIG. 7, in the fourth embodiment, the first green sheet 11a and the second green sheet 11b are adjacent to each other in the vertical direction in the multilayer structure 60 as in the third embodiment. However, the third green sheet 11c is interposed only between two second green sheets 11b adjacent to each other in the vertical direction, and no third green sheet 11c is interposed between two first green sheets 11a adjacent to each other in the vertical direction. By manufacturing the all-solid battery as described above, the thickness of the all-solid battery is reduced, and generation of cracks is inhibited.

The number of the first green sheets 11a and the number of the second green sheets 11b are not particularly limited. In the fourth embodiment, the number of the first green sheets 11a is 25 and the number of the second green sheets 11b is 25 as in the first embodiment.

Figure 8:
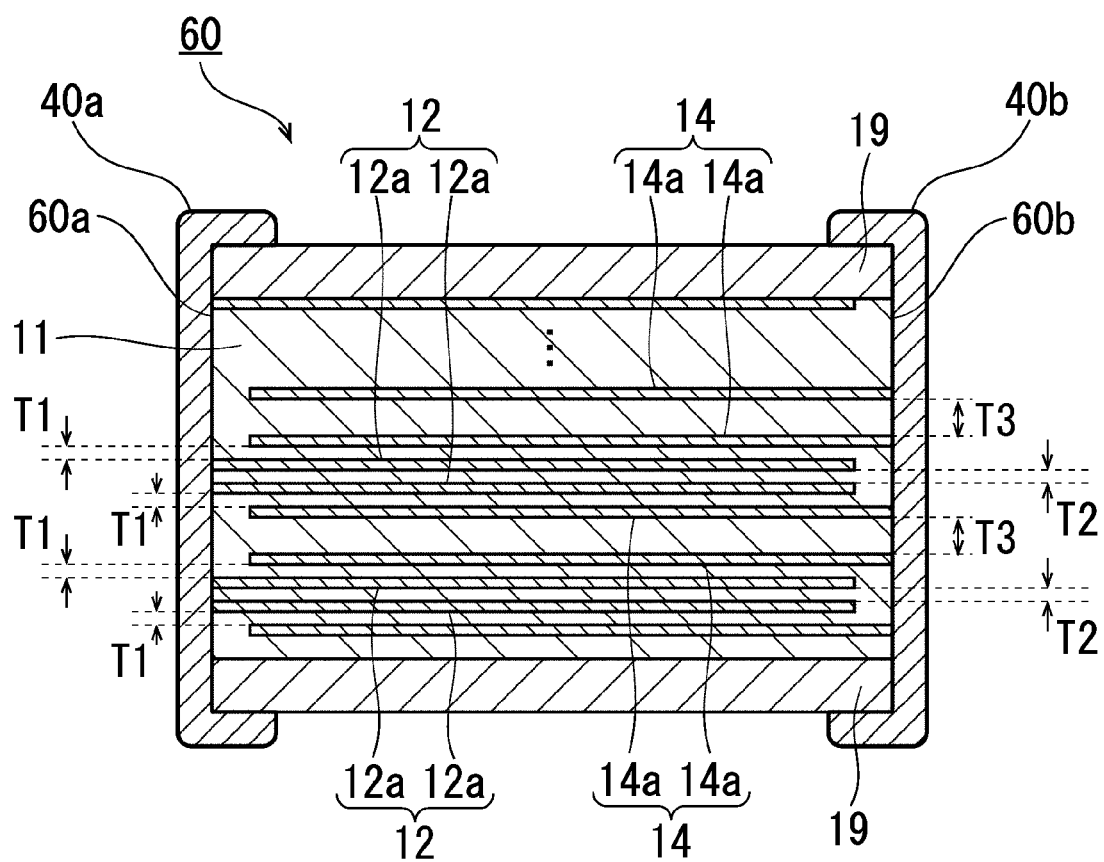
FIG. 8 is a schematic cross-sectional view of the all-solid battery in accordance with the fourth embodiment.

FIG. 8 is a schematic cross-sectional view of the all-solid battery in accordance with the fourth embodiment obtained by firing the multilayer structure 60. As illustrated in FIG. 8, in an all-solid battery 104 in accordance with the fourth embodiment, the thickness T3 of the solid electrolyte layer 11 between a pair of the negative electrode layers 14a is greater than the thickness T2 of the solid electrolyte layer 11 between a pair of the positive electrode layers 12a and the thickness T1 of the solid electrolyte layer 11 between the positive electrode layer 12a and the negative electrode layer 14a.

In this structure, the thickness T1 and the thickness T2 are both less than the thickness T3, and the number of the third green sheets 11c is less than that in the second embodiment as in the third embodiment. Therefore, the all-solid battery 104 is thinner than the all-solid battery 102 of the second embodiment.

EXAMPLE 4

The all-solid battery 104 was fabricated according to the fourth embodiment. The thickness T3 was approximately 20 μm, and the thickness T1 and the thickness T2 were both approximately 10 μm. In addition, no cracks were observed. Furthermore, the thickness of the all-solid battery 104 was less, by approximately 370 μm, than the thickness of the all-solid battery in which the third green sheet 11c is interposed between each two adjacent layers of all the layers.

Fifth Embodiment

Figure 9:
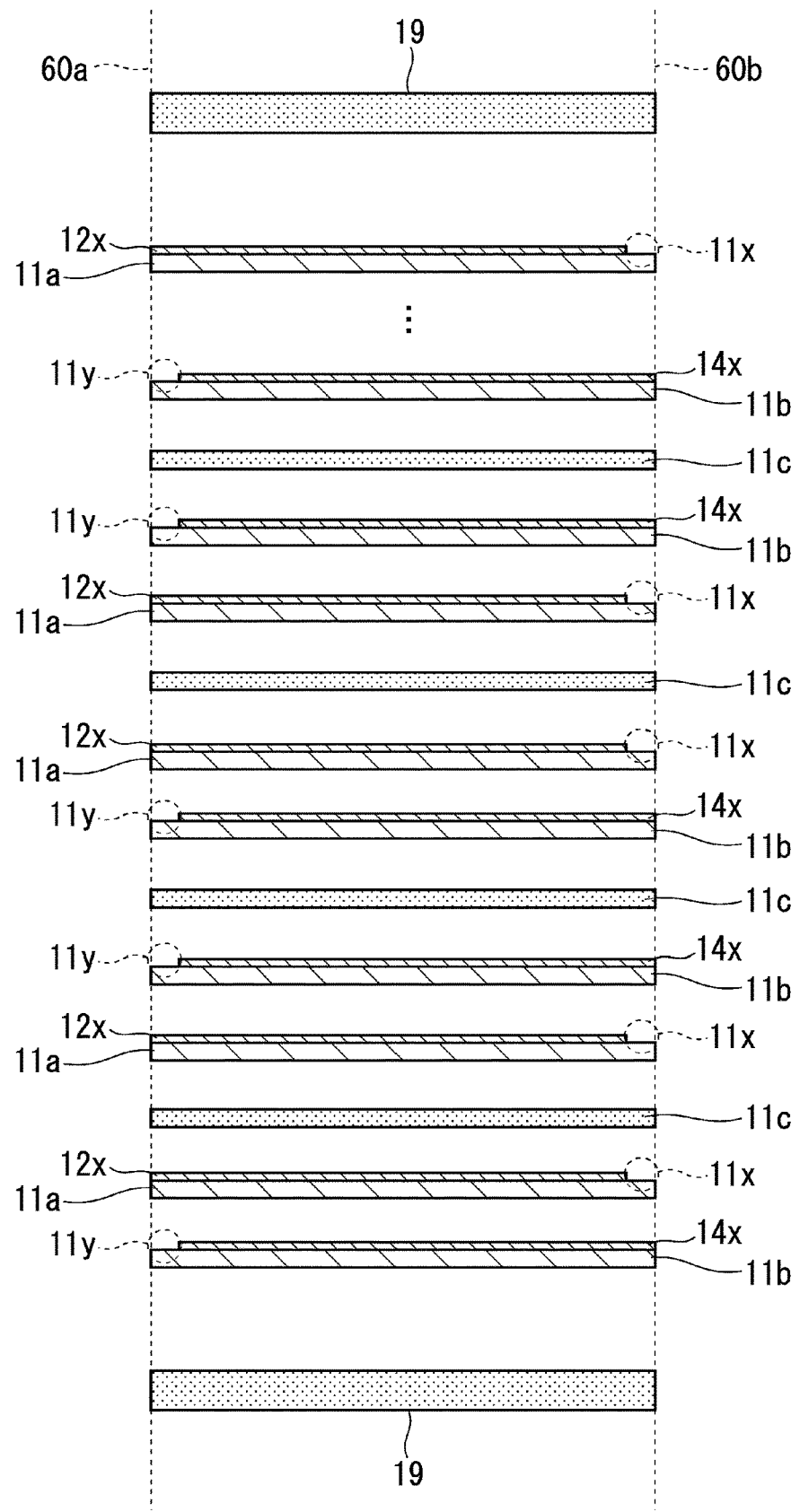
FIG. 9 is a cross-sectional view of an all-solid battery in the course of manufacturing in accordance with a fifth embodiment.

FIG. 9 is a cross-sectional view of an all-solid battery in the course of manufacturing in accordance with the fifth embodiment. In FIG. 9, the same elements as those described in the first to fourth embodiments are indicated by the same reference numerals as those in these embodiments, and the description thereof is omitted hereafter.

As illustrated in FIG. 9, in the fifth embodiment, the first green sheet 11a and the second green sheet 11b are adjacent to each other in the vertical direction in the multilayer structure 60 as in the second embodiment. In addition, the third green sheet 11c is interposed between two first green sheets 11a adjacent to each other in the vertical direction and another third green sheet 11c is interposed between two second green sheets 11b adjacent to each other in the vertical direction.

However, unlike the second embodiment, in the fifth embodiment, the material of the third green sheet 11c is different from the material of the first green sheet 11a and is different from the material of the second green sheet 11b. For example, a phosphate-based solid electrolyte having a NASICON structure is used as the material of the first green sheet 11a and the material of the second green sheet 11b, and LZP (Li-Zr-P-O), which is less expensive than the phosphate-based solid electrolyte having a NASICON structure, is used as the material of the third green sheet 11c. LZP is also used as the material of the cover layer 19. By manufacturing the all-solid battery as described above, the thickness of the all-solid battery is reduced and generation of cracks is inhibited.

The number of the first green sheets 11a and the number of the second green sheets 11b are not particularly limited. In the fifth embodiment, the number of the first green sheet 11a is 25 and the number of the second green sheets 11b is 25.

Figure 10:
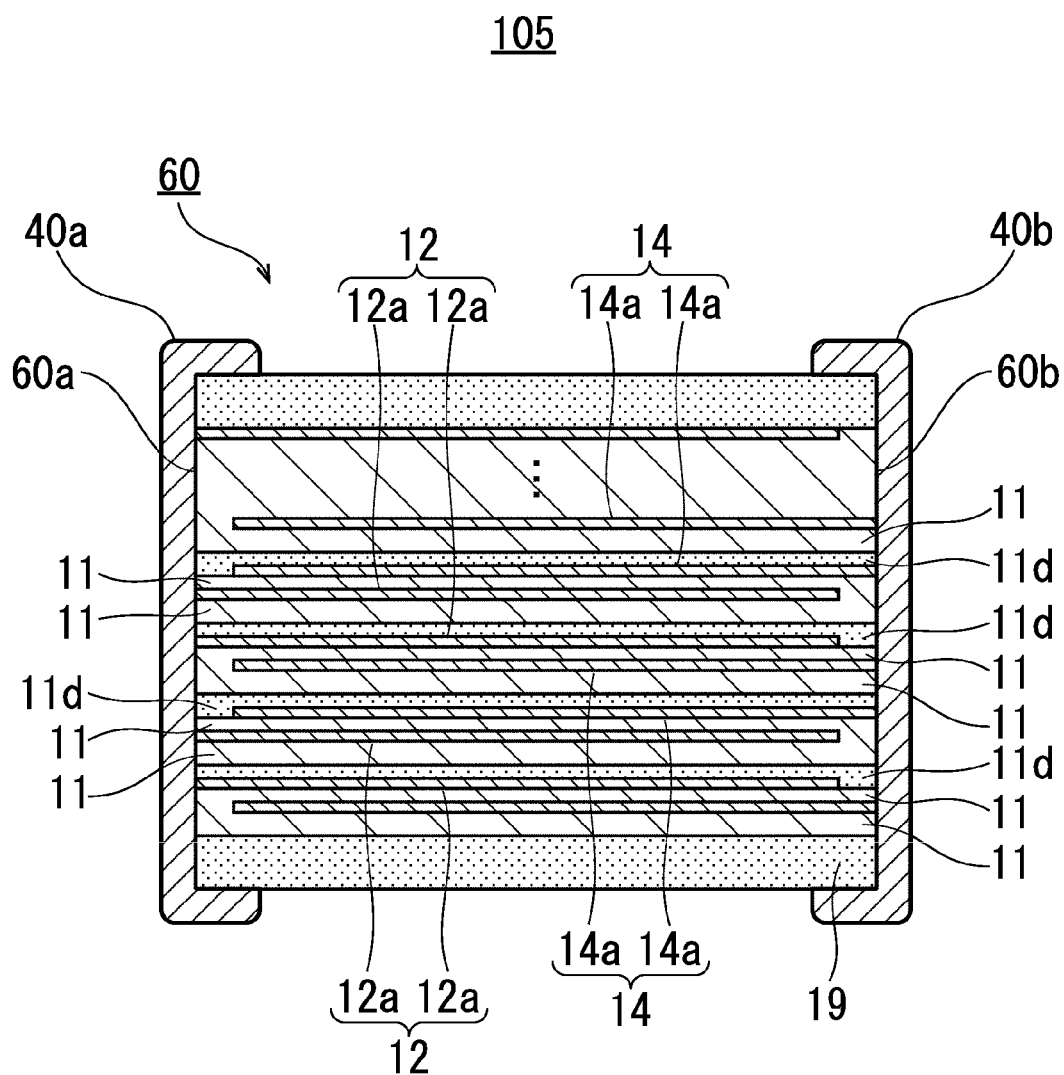
FIG. 10 is a schematic cross-sectional view of the all-solid battery in accordance with the fifth embodiment.

FIG. 10 is a schematic cross-sectional view of the all-solid battery in accordance with the fifth embodiment obtained by firing the multilayer structure 60. As illustrated in FIG. 10, in an all-solid battery 105 in accordance with the fifth embodiment, a layer 11d originated from the third green sheet 11c is interposed between a pair of the positive electrode layers 12a constituting the positive electrode 12, and another layer 11d is interposed between a pair of the negative electrode layers 14a constituting the negative electrode 14. Since the layer between a pair of the positive electrode layers 12a and the layer between a pair of the negative electrode layers 14a do not constitute a battery. Thus, even when the inexpensive layer 11d exists between these layers, the performance such as the battery capacity of the all-solid battery 105 is not largely reduced. Similarly, the cover layers 19 do not constitute a battery. Therefore, even when a sheet, which is less expensive than each of the green sheets 11a and 11b, is used as the cover layer 19, the performance of the all-solid battery 105 is not largely reduced, and the cost of the all-solid battery 105 can be reduced. Furthermore, for the same reason as the first embodiment, the all-solid battery 105 can be thinned, and generation of cracks is inhibited.

The fifth embodiment is not limited to the above. For example, the third green sheet 11c may be interposed only between a pair of the positive electrode layers 12a or only between a pair of the negative electrode layers 14a.

FIRST COMPARATIVE EXAMPLE

Figure 11:
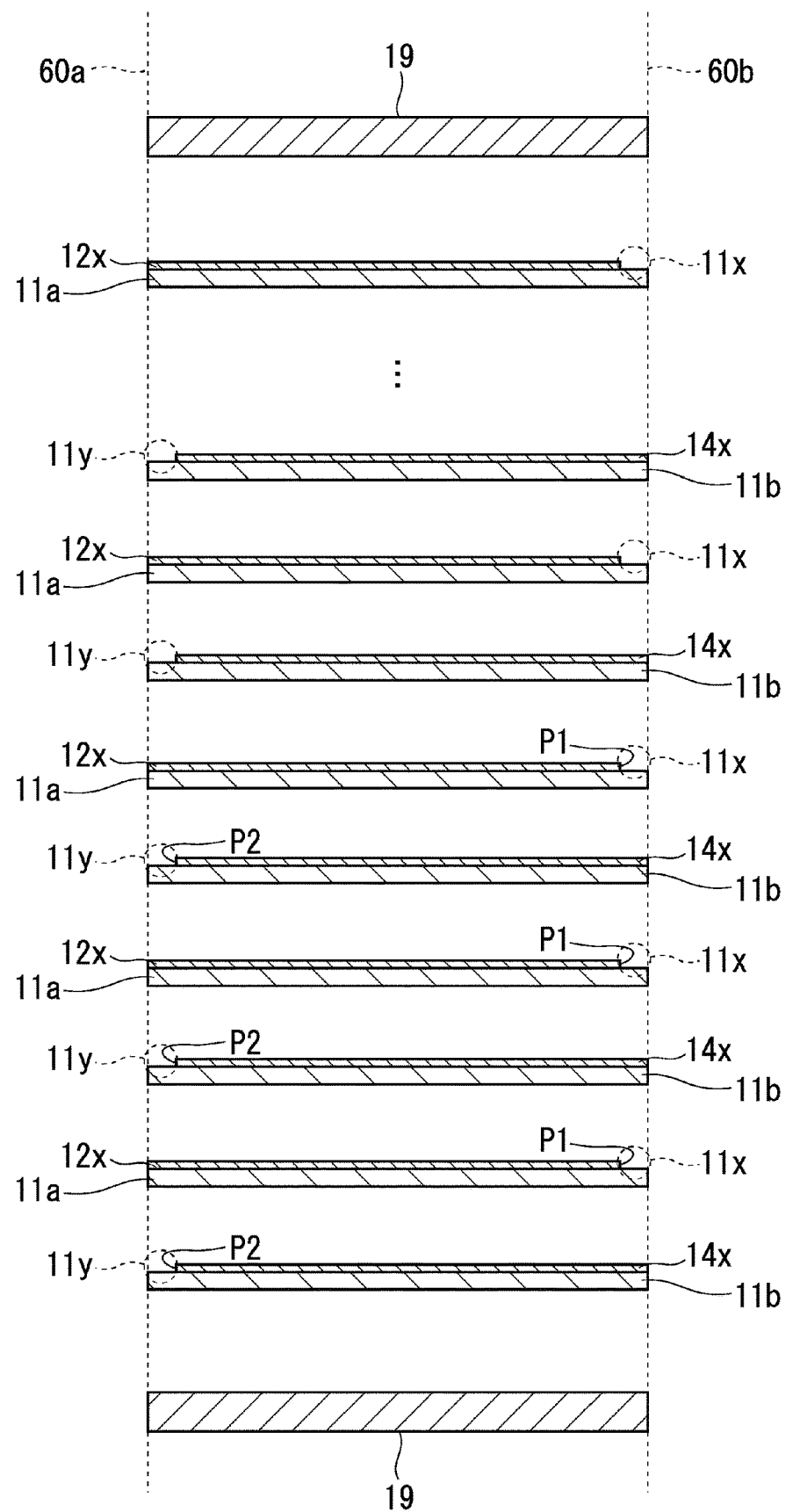
FIG. 11 is a cross-sectional view of an all-solid battery in the course of manufacturing in accordance with a first comparative example.

FIG. 11 is a cross-sectional view of an all-solid battery in the course of manufacturing in accordance with a first comparative example. In FIG. 11, the same elements as those described in the first to fifth embodiments are indicated by the same reference numerals as those in these embodiments, and the description thereof is omitted hereafter.

As illustrated in FIG. 11, in the first comparative example, the first green sheets 11a and the second green sheets 11b were alternately stacked without providing the third green sheet 11c. The number of the first green sheets 11a and the number of the second green sheets 11b were both 25.

Figure 12:
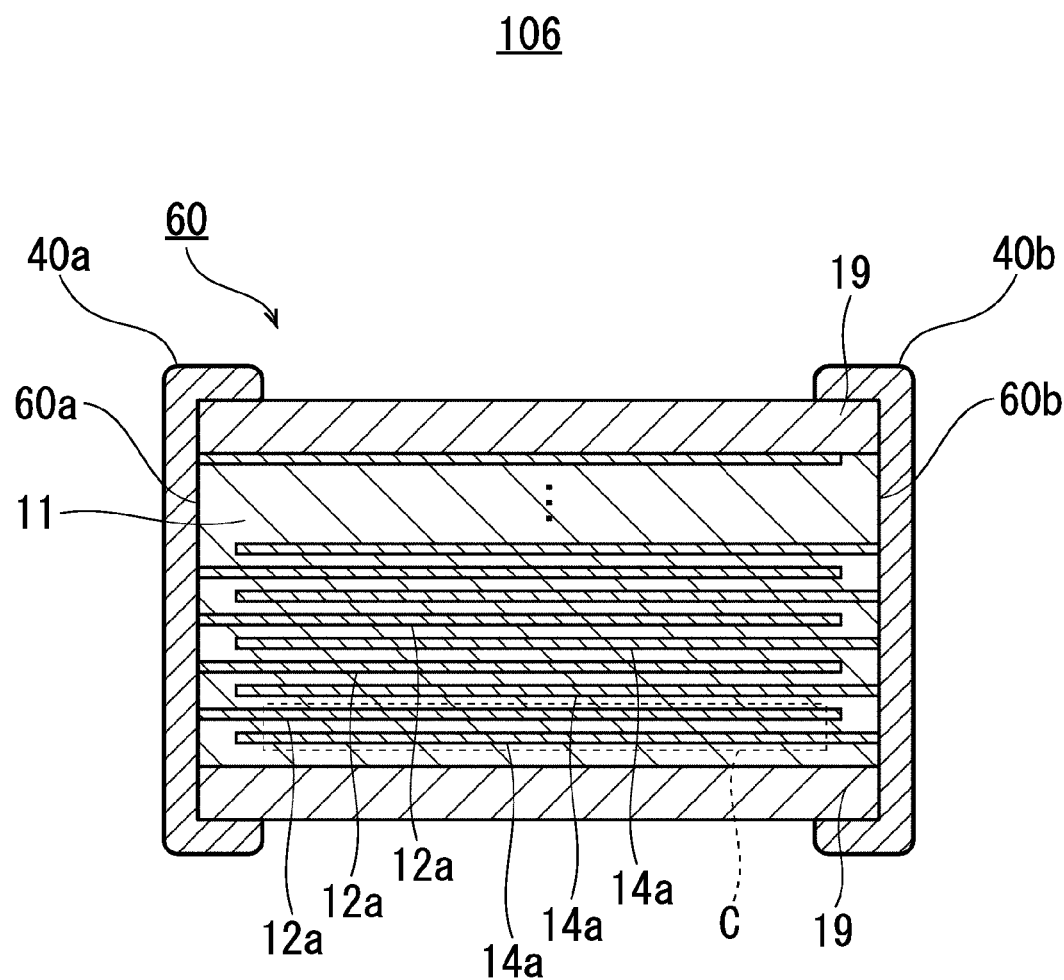
FIG. 12 is a schematic cross-sectional view of the all-solid battery in accordance with the first comparative example.

FIG. 12 is a schematic cross-sectional view of the all-solid battery in accordance with the first comparative example. In the first comparative example, 50 pairs of the positive electrode layer 12a and the negative electrode layer 14a, which were opposite to each other, were obtained. As a result, the capacity that is 50 times the capacity of one battery structure C was obtained. The thickness of the solid electrolyte layer 11 between the positive electrode layer 12a and the negative electrode layer 14a was 10 μm. In the first comparative example, the thickness of an all-solid battery 106 was reduced because no third green sheet 11c was provided. However, the level differences P1 and P2 were not filled with the third green sheet 11c, and a crack was generated in the edge of the multilayer structure 60.

SECOND COMPARATIVE EXAMPLE

Figure 13:
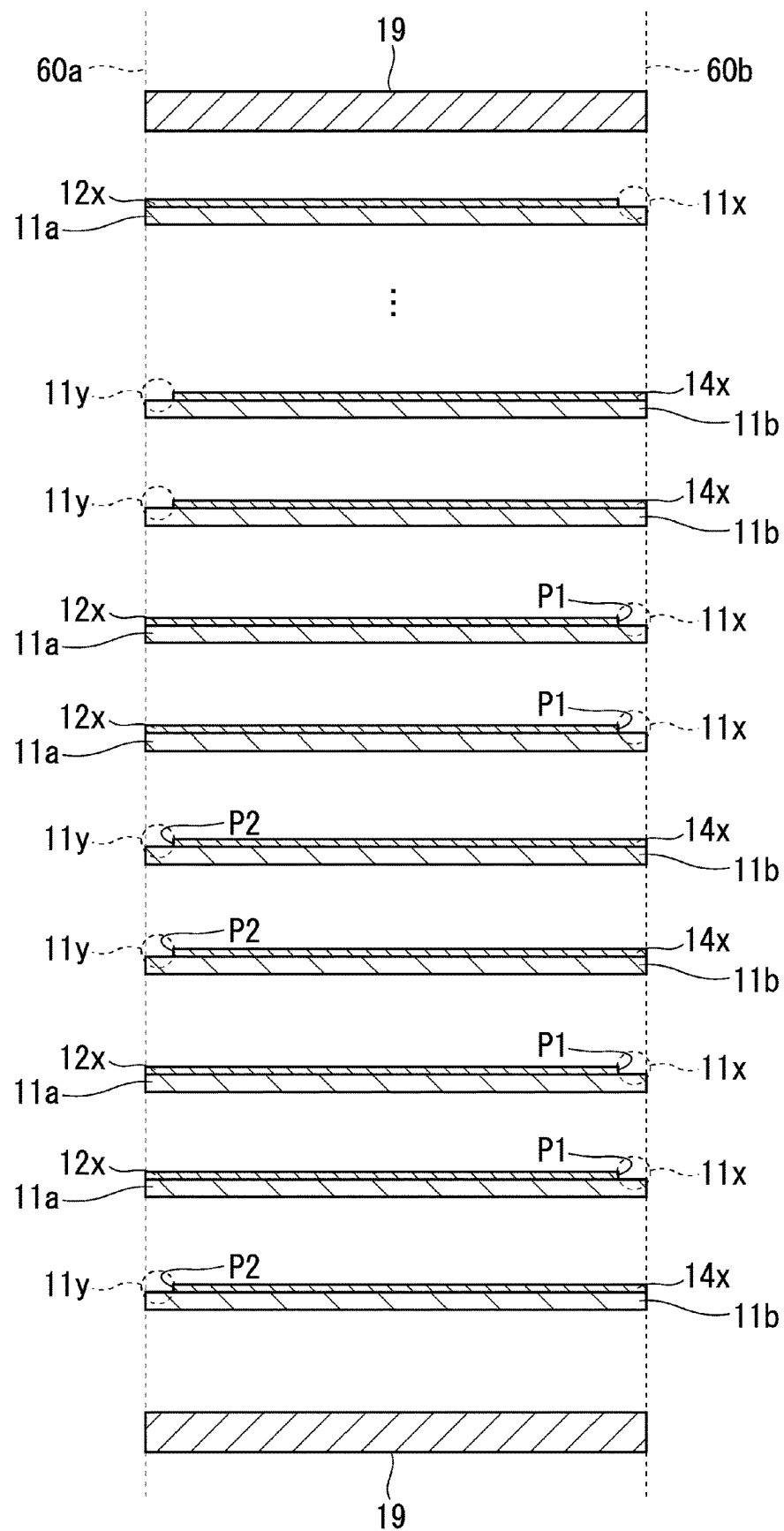
FIG. 13 is a cross-sectional view of an all-solid battery in the course of manufacturing in accordance with a second comparative example.

FIG. 13 is a cross-sectional view of an all-solid battery in the course of manufacturing in accordance with a second comparative example. In FIG. 13, the same elements as those described in the first to fifth embodiments are indicated by the same reference numerals in these embodiments, and the description thereof is omitted, hereafter.

As illustrated in FIG. 13, in the second comparative example, two first green sheets 11a were adjacent to each other in the vertical direction, and two second green sheets 11b were adjacent to each other in the vertical direction as in the first embodiment. However, unlike the first embodiment, in the second comparative example, no third green sheet 11c was provided. The number of the first green sheet 11a was 25, and the number of the second green sheets 11b was 25.

Figure 14:
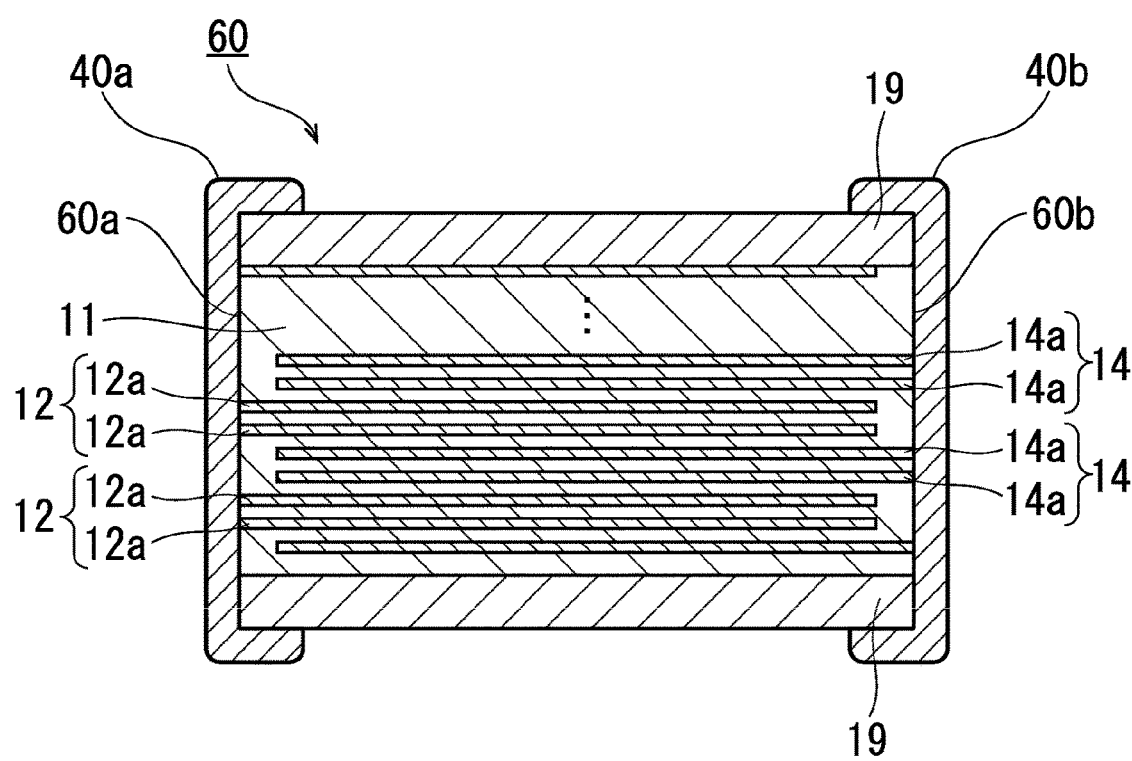
FIG. 14 is a schematic cross-sectional view of the all-solid battery in accordance with the second comparative example.

FIG. 14 is a schematic cross-sectional view of the all-solid battery in accordance with the second comparative example. As illustrated in FIG. 14, in the second comparative example, no third green sheet 11c was provided, and thus the thickness of an all-solid battery 107 was reduced. The thickness of the solid electrolyte layer 11 between the positive electrode layers 12a adjacent to each other in the vertical direction was 10 μm. Similarly, the thickness of the solid electrolyte layer 11 between the negative electrode layers 14a adjacent to each other in the vertical direction and the thickness of the solid electrolyte layer 11 between the positive electrode layer 12a and the negative electrode layer 14a were also 10 μm. However, the level differences P1 and P2 were not filled with the third green sheet 11c, and a crack was observed in the edge of the multilayer structure 60.

THIRD COMPARATIVE EXAMPLE

Figure 15:
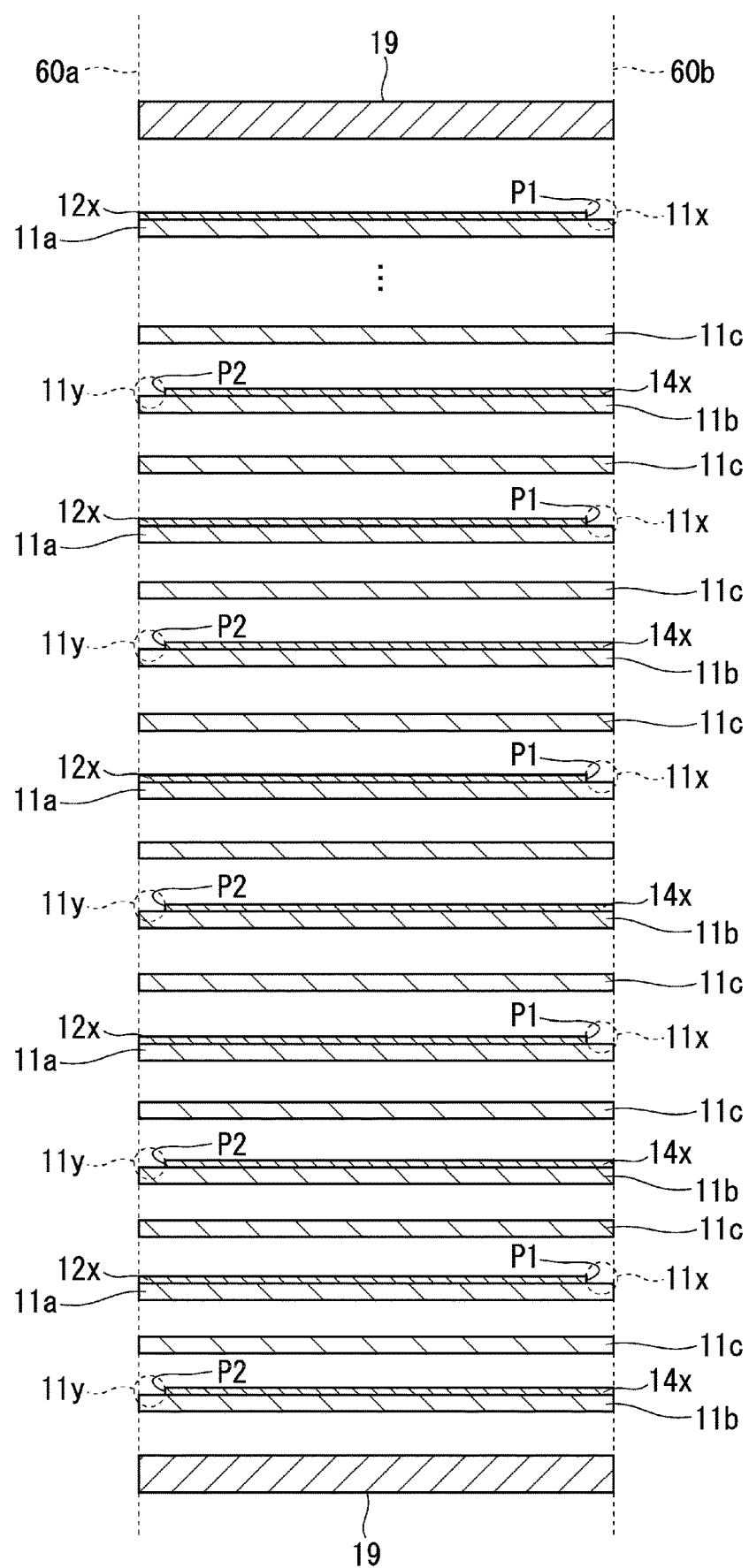
FIG. 15 is a cross-sectional view of an all-solid battery in the course of manufacturing in accordance with a third comparative example.

FIG. 15 is a cross-sectional view of an all-solid battery in the course of manufacturing in accordance with a third comparative example. In FIG. 15, the same elements as those described in the first to fifth embodiments are indicated by the same reference numerals in these embodiments, and the description thereof is omitted, hereafter.

As illustrated in FIG. 15, in the third comparative example, the third green sheet 11c was interposed between each two adjacent layers of the first green sheets 11a and the second green sheets 11b.

Figure 16:
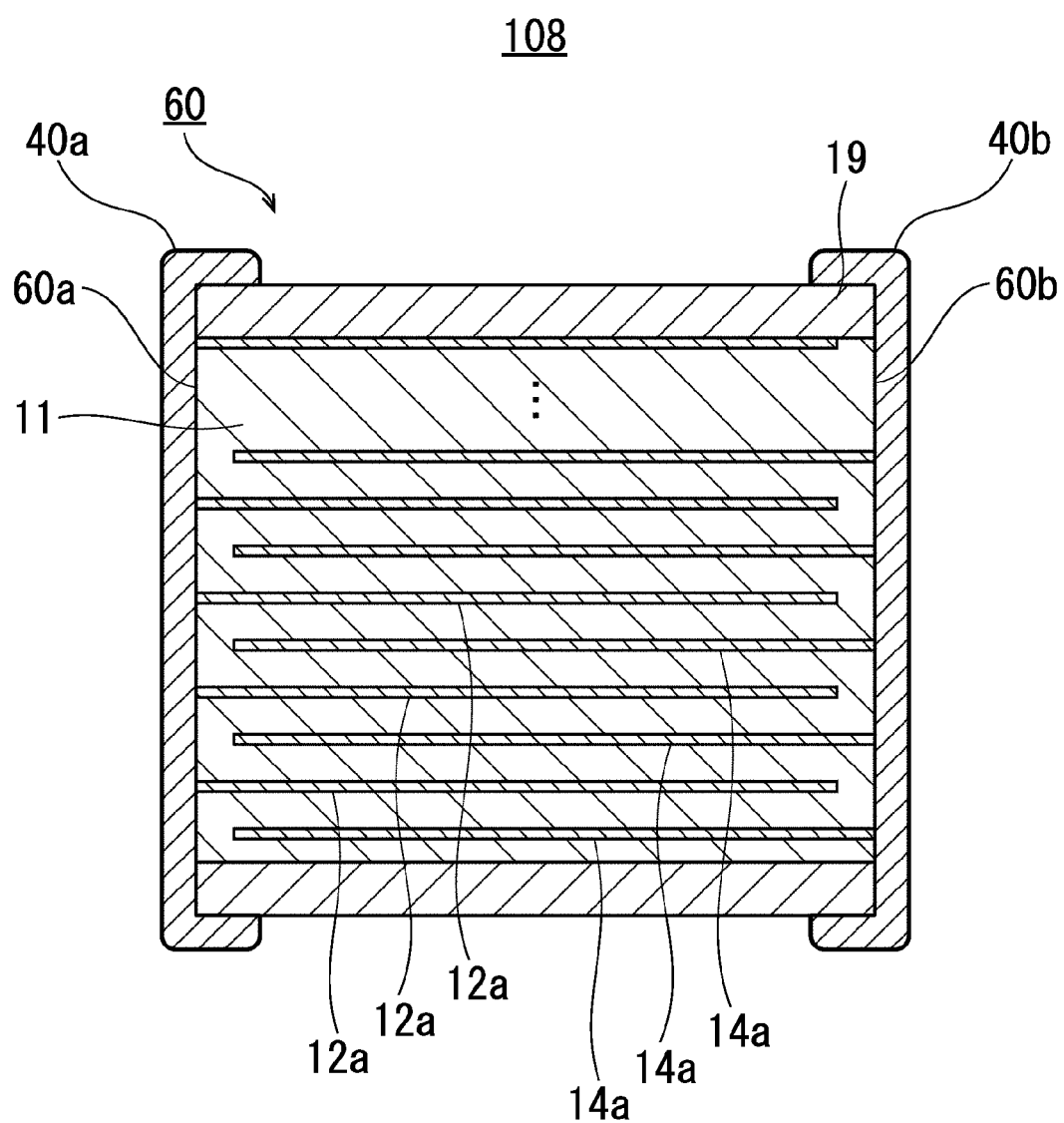
FIG. 16 is a schematic cross-sectional view of the all-solid battery in the third comparative example.

FIG. 16 is a schematic cross-sectional view of the all-solid battery in accordance with the third comparative example. As illustrated in FIG. 16, in the third comparative example, since the third green sheet 11c was interposed between each two adjacent layers, the level differences P1 and P2 were filled with the third green sheet 11c, cracks were inhibited from being generated in the multilayer structure 60. The thickness of the solid electrolyte layer 11 between the positive electrode layer 12a and the negative electrode layer 14a was 20 μm. However, since the third green sheet 11c was disposed between each two adjacent layers, an all-solid battery 108 became thick, and the thickness of the all-solid battery 108 was greater, by approximately 490 μm, than the thickness of the all-solid battery of the first comparative example.

Figure 17:
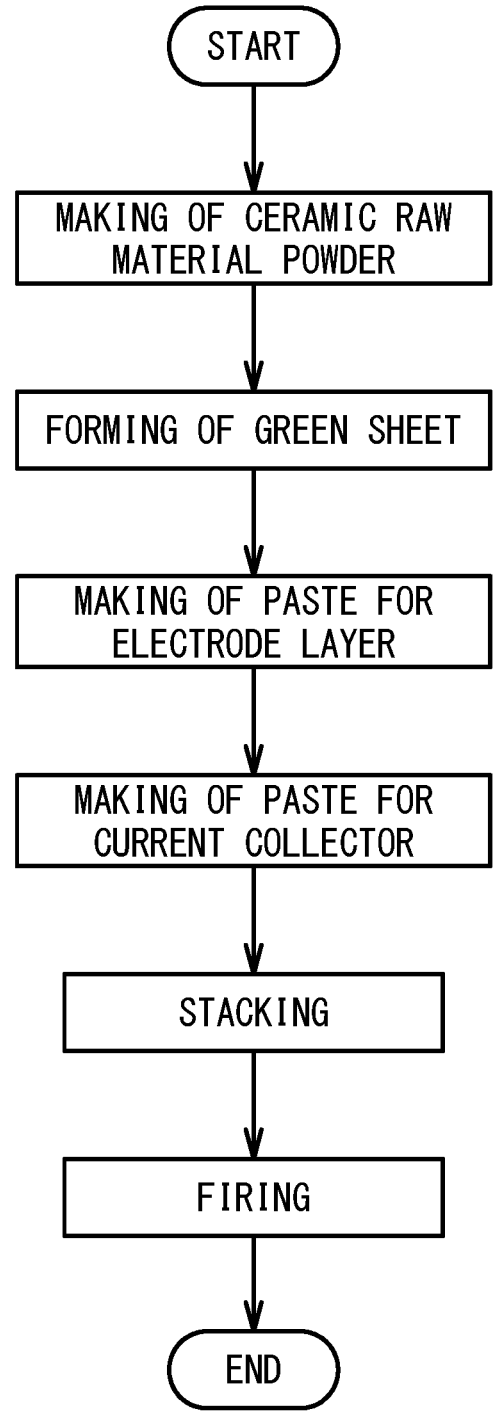
FIG. 17 is a flowchart of a manufacturing method of the all-solid batteries in accordance with the first to fifth embodiments.

Next, a manufacturing method of the all-solid batteries 101 to 105 in accordance with the first to fifth embodiments will be described. FIG. 17 is a flowchart of the manufacturing method of the all-solid battery in accordance with the first to fifth embodiments.

[Making Process of Ceramic Raw Material Powder]

First, powder of the phosphate-based solid electrolyte structuring the solid electrolyte layer 11 is made. For example, it is possible to make the powder of the phosphate-based solid electrolyte structuring the solid electrolyte layer 11, by mixing raw materials and additives and using a solid phase synthesis method or the like. The resulting powder is subject to dry grinding. Thus, an average particle diameter of the resulting power is adjusted to a desired one. For example, the average particle diameter is adjusted to a desired one with use of, for example, a planetary ball mill having $ZrO_2$ balls with a diameter of 5 mm.

The additives include a sintering additive. Included as the sintering additive is one or more of glass components such as a Li-B-O-based compound, a Li-Si-O-based compound, a Li-C-O-based compound, a Li-S-O-based compound, and a Li-P-O-based compound.

[Forming Process of Green Sheet]

Then, the resulting powder is uniformly dispersed into aqueous solvent or organic solvent together with a binding agent, a dispersing agent, a plasticizer and so on. The resulting powder is subject to wet crushing. Thereby, solid electrolyte slurry having a desired average particle diameter is obtained. In this case, a bead mill, a wet jet mill, a kneader, a high-pressure homogenizer, or the like may be used. It is preferable that the bead mill is used because adjusting of particle size distribution and dispersion are performed at the same time. A binder is added to the resulting solid electrolyte slurry. Thus, solid electrolyte paste is obtained. The first to third green sheets 11a to 11c are formed by applying the solid electrolyte paste. The green sheet for the cover layer 19 is formed in the same manner. The application method is not limited to a specific method. For example, a slot die method, a reverse coat method, a gravure coat method, a bar coat method, a doctor blade method or the like may be used. It is possible to measure particle diameter distribution after the wet crushing, with use of a laser diffraction measuring device using a laser diffraction scattering method.

[Making Process of Paste for Electrode Layer]

Next, paste for electrode layer is made to make the positive electrode layer 12a and the negative electrode layer 14a. For example, an electrode active material and a solid electrolyte material are highly dispersed by a bead mill or the like to make ceramic paste composed of only ceramic particles. Carbon paste containing carbon particles prepared so as not to be dispersed too highly may be made, and the ceramic paste and the resulting carbon paste may be mixed well. Carbon black may be used as the carbon particles.

[Making Process of Paste for Current Collector]

Next, paste for current collector is made to make the first current collector layer 12b and the second current collector layer 14b. For example, powder of Pd, a binder, a dispersant, a plasticizer, and so on are uniformly dispersed in water or organic solvent. Thus, the paste for current collector is obtained.

[Stacking Process]

First, the paste for electrode layer and the paste for current collector are printed on both faces of the first green sheet 11a and both faces of the second green sheet 11b. The printing method is not particularly limited, and may be a screen-printing method, an intaglio printing method, a relief printing method, or a calendar roll method. The screen printing is considered as the most typical method for fabricating the multilayer device having many thin layers stacked. However, use of ink-jet printing may be preferable when exceptionally fine electrode patterns or patterns having a special shape are printed. Neither the paste for electrode layer nor the paste for current collector is printed on the third green sheet 11c.

[Firing Process]

Next, the resulting multilayer structure 60 is fired. To inhibit disappearance of the carbon material contained in the paste for electrode layer, it is preferable to set an upper limit for the oxygen partial pressure of the firing atmosphere.

More specifically, the oxygen partial pressure of the firing atmosphere is preferably $2\times10^{-13}$ atm or less. On the other hand, to inhibit the melting of the phosphate-based solid electrolyte, it is preferable to set a lower limit for the oxygen partial pressure of the firing atmosphere. More specifically, the oxygen partial pressure of the firing atmosphere is preferably $5\times10^{-22}$ atm or greater. By setting the range of the oxygen partial pressure as described above, the disappearance of the carbon material and the melting of the phosphate-based solid electrolyte are inhibited. The method of adjusting the oxygen partial pressure of the firing atmosphere is not limited to a specific method.

Thereafter, a metal paste is applied to each of the side faces 60a and 60b of the multilayer structure 60, and is fired. This process forms the first external electrode 40a and the second external electrode 40d. Alternatively, the first external electrode 40a and the second external electrode 40b may be formed by sputtering. The first external electrode 40a and the second external electrode 40b may be formed by plating the formed electrodes. Through the above process, the fundamental structure of the all-solid battery is completed.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. An all-solid battery comprising:
    a multilayer structure that includes a plurality of pairs of positive electrode layers, a plurality of pairs of negative electrode layers, first solid electrolyte layers, second solid electrolyte layers, and third solid electrolyte layers, the plurality of pairs of positive electrode layers and the plurality of pairs of negative electrode layers being alternately stacked, each of the first solid electrolyte layers being interposed between each of the pairs of positive electrode layers, each of the second solid electrolyte layers being interposed between each of the pairs of negative electrode layers, each of the third solid electrolyte layers being interposed between the positive electrode layer and the negative electrode layer,
    wherein a thickness of the third solid electrolyte layer is different from at least one of a thickness of the first electrolyte layer and a thickness of the second electrolyte layer.

2. The all-solid battery according to claim 1, wherein the third solid electrolyte layer is thicker than the first solid electrolyte layer and is thicker than the second solid electrolyte layer.

3. The all-solid battery according to claim 1, wherein the first solid electrolyte layer is thicker than the third solid electrolyte layer, and the second solid electrolyte layer is thicker than the third solid electrolyte layer.

4. The all-solid battery according to claim 1, wherein the first solid electrolyte layer is thicker than the second solid electrolyte layer, and is thicker than the third solid electrolyte layer.

5. The all-solid battery according to claim 1, wherein the second solid electrolyte layer is thicker than the first solid electrolyte layer, and is thicker than the third solid electrolyte layer.

6. The all-solid battery according to claim 1, further comprising a plurality of battery structures each being constructed of the positive electrode layer and the negative electrode layer adjacent to each other in a vertical direction and the third solid electrolyte layer interposed between the positive electrode layer and the negative electrode layer adjacent to each other in the vertical direction,
    wherein a thickness of the third solid electrolyte layer between the positive electrode layer and the negative electrode layer is equal among the plurality of battery structures.

7. The all-solid battery according to claim 1, wherein a layer made of a material different from materials of the first to third solid electrolyte layers is interposed between each of the pairs of positive electrode layers, or between each of the pairs of negative electrode layers, or between each of the pairs of positive electrode layers and between each of the pairs of negative electrode layers.

8. A manufacturing method of an all-solid battery comprising:
    making a multilayer structure by stacking a pair of first green sheets each having a positive electrode paste applied on a surface thereof, a pair of second green sheets each having a negative electrode paste applied on a surface thereof, and a third green sheet having no conductive paste applied on both surfaces thereof; and
    firing the multilayer structure to make the first to third green sheets into solid electrolyte layers, the positive electrode paste into a positive electrode layer, and the negative electrode paste into a negative electrode layer,
    wherein the making of the multilayer structure includes alternately stacking the pair of first green sheets and the pair of second green sheets in plural, and arranging the third green sheet so that the third green sheet is interposed at least between the pair of first green sheets, between the pair of second green sheets, or between the first green sheet and the second green sheet.

* * * * *